Dec. 1, 1953

A. C. SCHROEDER 2,660,844

CARTON HANDLING APPARATUS

Filed June 24, 1948

8 Sheets-Sheet 1

INVENTOR.
ARTHUR C. SCHROEDER
BY Bodell & Thompson
Attorneys

Dec. 1, 1953 A. C. SCHROEDER 2,660,844

CARTON HANDLING APPARATUS

Filed June 24, 1948 8 Sheets-Sheet 2

INVENTOR.
ARTHUR C. SCHROEDER
BY Bodell & Thompson
Attorneys

CARTON HANDLING APPARATUS

Filed June 24, 1948 8 Sheets-Sheet 3

INVENTOR.
ARTHUR C. SCHROEDER
BY Bodell & Thompson
Attorneys

Dec. 1, 1953 A. C. SCHROEDER 2,660,844
CARTON HANDLING APPARATUS
Filed June 24, 1948 8 Sheets-Sheet 4

INVENTOR.
ARTHUR C. SCHROEDER
BY Bodell & Thompson
ATTORNEYS

INVENTOR.
ARTHUR C. SCHROEDER
BY Bodell & Thompson
Attorneys

Dec. 1, 1953 A. C. SCHROEDER 2,660,844

CARTON HANDLING APPARATUS

Filed June 24, 1948 8 Sheets-Sheet 6

INVENTOR.
ARTHUR C. SCHROEDER
BY Bodell & Thompson
Attorneys

INVENTOR.
ARTHUR C. SCHROEDER
BY Bodell & Thompson
Attorneys

Dec. 1, 1953

A. C. SCHROEDER 2,660,844

CARTON HANDLING APPARATUS

Filed June 24, 1948

8 Sheets-Sheet 8

INVENTOR.
ARTHUR C. SCHROEDER
BY Bodell & Thompson
Attorneys

Patented Dec. 1, 1953

2,660,844

UNITED STATES PATENT OFFICE 2,660,844

CARTON HANDLING APPARATUS

Arthur C. Schroeder, Skaneateles, N. Y.

Application June 24, 1948, Serial No. 35,017

17 Claims. (Cl. 53—91)

This invention relates, in general, to apparatus for handling cartons, and more particularly the application of adhesive to the end flaps of the carton while in flat collapsed condition, automatically expending the carton to open form for filling, folding and sealing the end closure flaps after the carton has been filled. The apparatus is adapted to operate on cartons of conventional form which are shipped in flat folded condition and provided with integral end flaps at opposite ends.

This invention has as an object a carton handling apparatus which is operable automatically to advance flat folded cartons successively to a carton filling station. During such advancement, certain selected ones of the bottom and top end flaps are coated with a suitable adhesive.

The apparatus further includes means operable automatically as the cartons reach the filling station to expand the cartons into tubular form and fold the bottom end flaps upwardly to form the bottom end closure of the carton. During this folding operation, certain of the top end flaps are folded outwardly to permit the contents to be conveniently placed in the carton while it is supported in expanded form at the filling station. The filled carton is advanced from the filling station to and past a sealing station from which it is discharged.

The invention has as a further object a particularly simple and economical structure for performing the above operations automatically, the apparatus being operated through a complete cycle by a single actuation on the part of the operator.

The invention consists in the novel features and in the combinations and constructions hereinafter set forth and claimed.

In describing this invention, reference is had to the accompanying drawings in which like characters designate corresponding parts in all the views.

Figures 20 to 25 inclusive are a series of perspective views of the carton and contiguous parts of the apparatus illustrating the operations performed successively on the cartons from the supply to the carton filling station.

The apparatus consists of a base structure in the form of a rectangular box having side members 30 and end members 31, and a plurality of uprights 32, 33, 34, 35, 36, 37, 38, 39, 40, extending upwardly from the base members 30, 31.

Figures 1, 13:
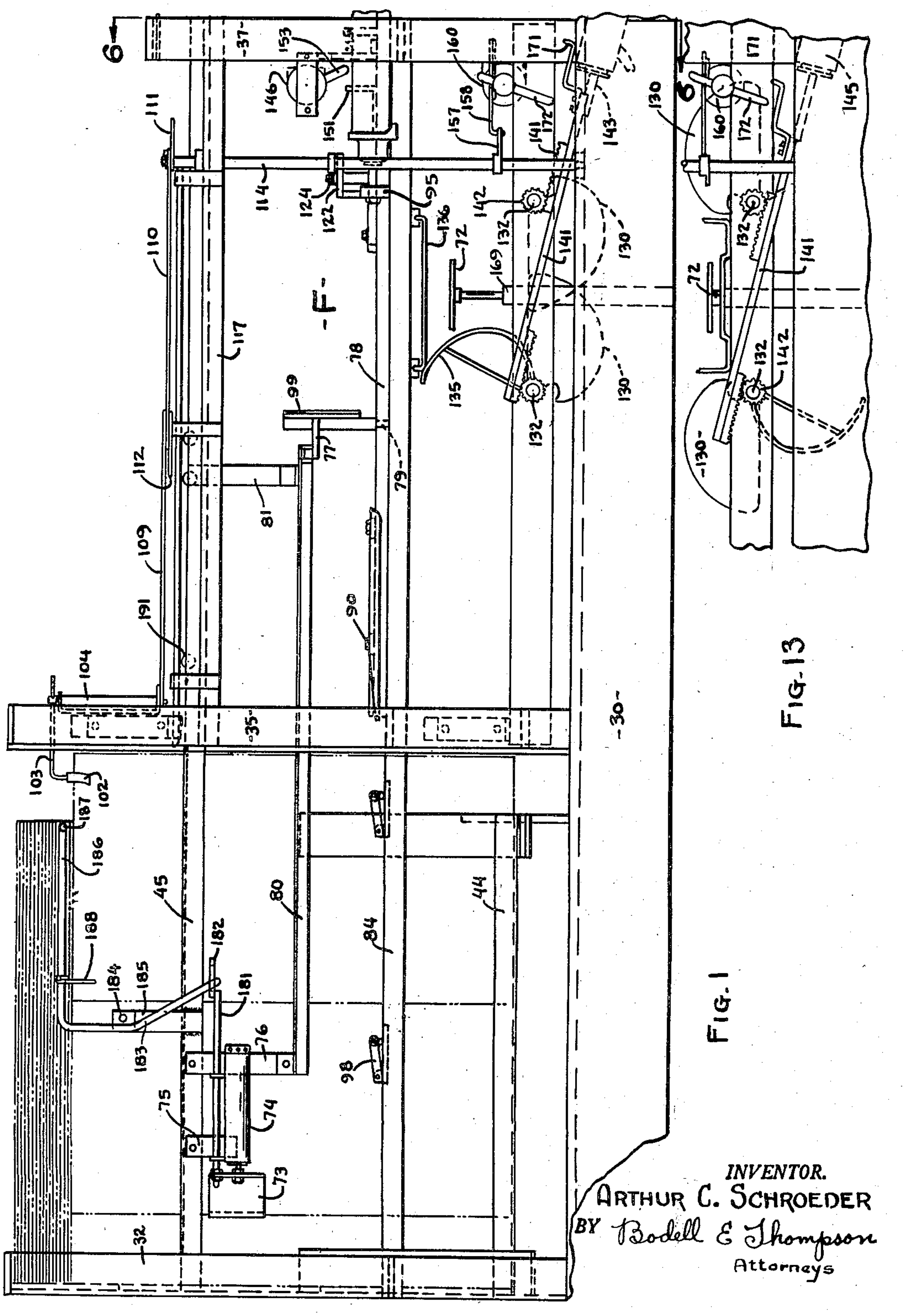
Figure 1 is a side elevational view of the major portion of an apparatus embodying my invention.
Figure 13 is a side elevational view of the mechanism for folding up the bottom flaps, the flap engaging members of which are shown positioned prior to the folding operation.
Figure 4:
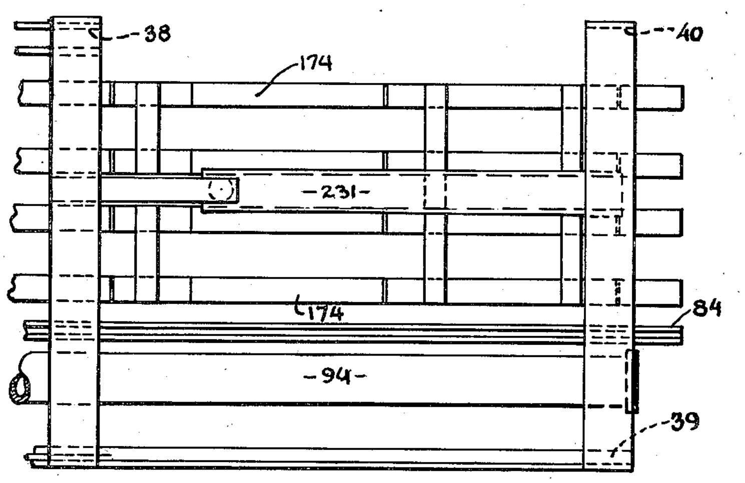
Figure 4 is a top plan view of the structure shown in Figure 2.
Figure 3:
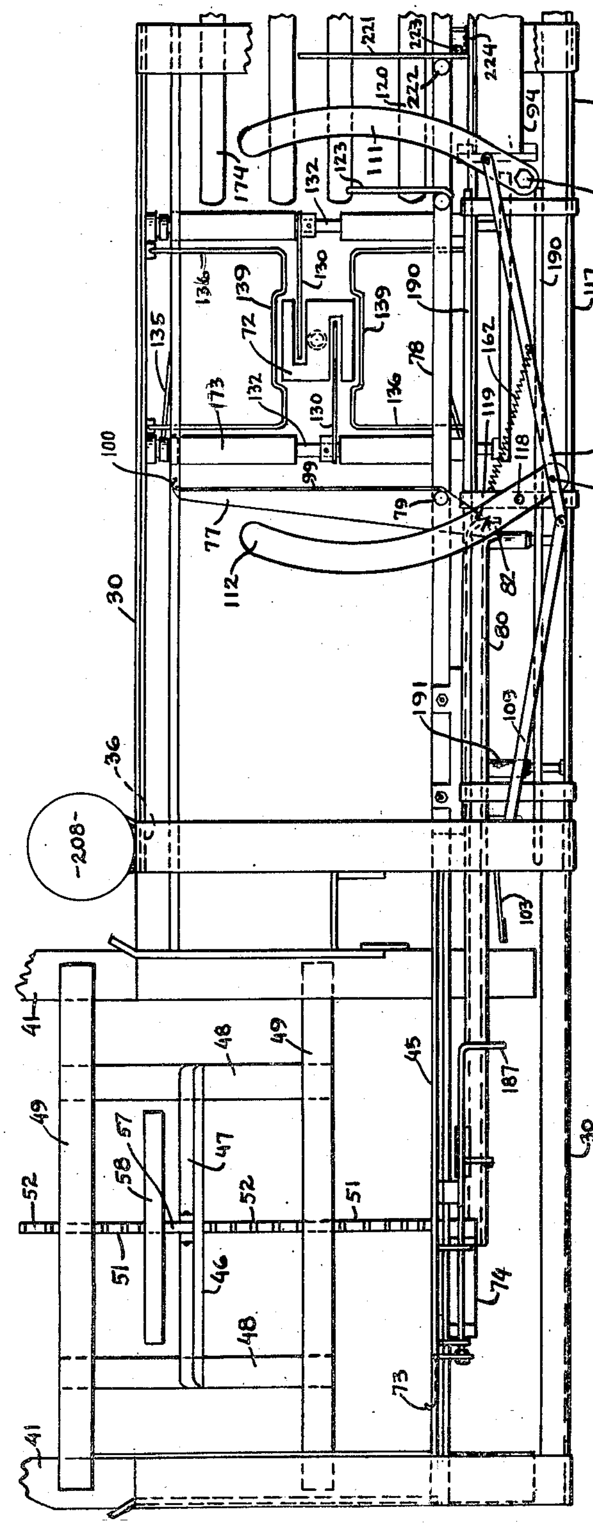
Figure 3 is a top plan view of the structure shown in Figure 1, with the top flap folding arms shown in open position.

Means is provided for supporting a supply of flat collapsed cartons at the left end of the machine, Figures 1 and 3. A pair of carton supporting rails 41 extending rearwardly and are inclined upwardly from the base of the machine.

The outer ends of the rails 41 are supported on legs 42. The cartons descend on the rails 41 to a stop plate 44, the upper portion of the cartons engaging a rail 45 extending lengthwise of the machine.

The cartons C are urged downwardly on the supporting rails 41 by a plate 46 extending vertically upwardly from a cross member 47, the ends of which are secured to bars 48 which, in turn, have secured to their ends bars 49 extending transversely between the supporting rails 41, and being slidably mounted thereon, see Figure 3. The bars 48 also have members 50 similar to the members 49 engaging the under side of the supporting rails 41. A bar 51 is positioned intermediate the rails 41, and the upper edge portion of this bar is provided with a series of notches 52. The upper end of the bar 51 is slidably mounted in a cross member extending between the uprights 42. The lower end of the bar is secured to a piston rod 53 provided with a piston at each end slidably mounted in cylinders 54, 55, which are fixedly secured to the frame of the machine, see Figures 5–17. Periodically and alternately, the cylinders 54, 55, are supplied with fluid under pressure to effect lengthwise reciprocation of the bar 51. A finger 57 is pivotally mounted at one end to the plate 46, the opposite end being adapted to enter the notches 52 of the bar 51. To effect such engagement with certainty, the finger is provided with a weight 58.

With this arrangement, the plate 46 is moved downwardly by increments equivalent to the spacing between the notches 52 or, in other words, the reciprocation of the bar 51 maintains a feed pressure on the supply of cartons so there is always one positioned against the stop bars 44, 45.

The cartons are arranged in flat collapsed form. It will be understood that these cartons are of conventional construction including a body portion having side wall panels 60, 61, 62, 63. Each of these panels has a continuation in the form of a top end closure flap, these flaps being designated 64, 65, 66 and 67, respectively. Likewise, the side panels have depending flaps designated 68, 69, 70 and 71, respectively. As the cartons are positioned upon the supporting rails 41, the top and bottom end flaps extend vertically. The cartons are successively advanced to the right, Figures 1 and 3, from the carton supply to a filling station, indicated at F, Figure 1, this station being immediately above a carton supporting pedestal 72.

The cartons are selected and advanced a short distance forward from the supply by a carton selecting mechanism. This mechanism consists of an angle plate 73 having one side arranged to engage the side panel 61 of the cartons. The rear edge of this side of the plate is curved, or formed with a hook to hook about the rear edge of the carton. The other side or leg of the angle plate is secured to a piston rod having a piston slidably mounted in a cylinder 74 secured to brackets 75, 76, depending from the rail 45. When fluid under pressure is supplied to the left end of the cylinder Figure 1, the plate 73 moves to the right, moving the carton engaged by the plate a short distance to the right, as illustrated by dotted outline Figure 1 and in Figure 20. The carton in this position is engaged by an arm 77 pivotally mounted adjacent one end to a slide 78, as at 79. The end of the arm 77, adjacent the pivot 79, is provided with a roller arranged in a groove formed in the under side of a cam track 80 extending from the depending member 76 to a depending member 81, and terminating in a short laterally or outwardly extending portion 82.

The slide 78 is mounted upon a pair of spaced apart guide rails 84 extending the major portion of the length of the machine, the forward rail being supported by a plurality of horizontally extending plates 85 extending inwardly from the uprights 32, 35, 37, 39. The inner rail at the left end of the machine is secured to a transversely extending member 86, and at the right end of the machine it is secured to the outer rail 84. The slide 78 is provided with a plurality of rods 87 positioned in the space between the guide rails 84 and provided at their lower ends with nuts 88.

The slide 78 extends rearwardly from the pivot 79, and is provided with a cam member 90 for actuating valves for controlling the adhesive applying mechanism. The rear end of the cam member is inclined downwardly, as at 91, and the forward end is shaped with an upwardly curved cam surface 92, see Figures 11 and 12. The opposite end of the slide 78 is connected to a piston rod 93 having a piston slidably mounted in cylinder 94 secured in the frame of the machine. The connection between the piston rod and slide being effected through a transversely extending arm 95. The cylinder 94 is of substantial length to effect movement of the slide 78 to the left Figure 1, until the forward end 92 of the actuating element moves to the left of the valve control lever 98. When the slide is moved to the left from the position shown in Figures 1 and 3, the initial part of this movement effects rotation of the lever 77 about its pivot 79 in a counterclockwise direction, with the lever assuming a position parallel with the slide. This movement of the lever is effected by the curved end portion 82 of the cam bar 80, as will be apparent, and because the remaining portion of the cam bar is straight and parallel with the guide rails 84, the lever will move in parallel relation to the guide rails. The face of the lever is provided with a plate 99 of substantial width, it being formed on its free end with a hook portion 100 which moves over and in engagement with the rear edge of the carton in the same manner as the hook portion of the plate 73 of the carton selector mechanism. When the plate 99 has thus engaged the rear edge of the carton, forward movement of the slide effects forward movement of the carton in its edgewise position. However, prior to such forward movement, the top end flap 64 is folded downwardly from vertical to horizontal position.

Figure 24:
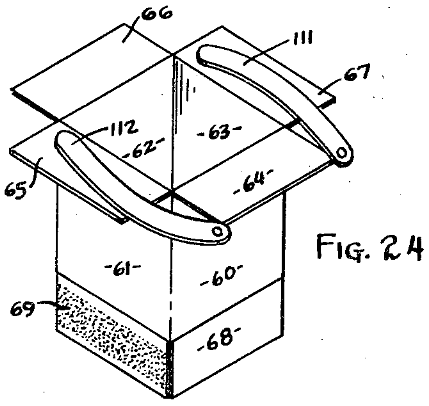
Figure 25:
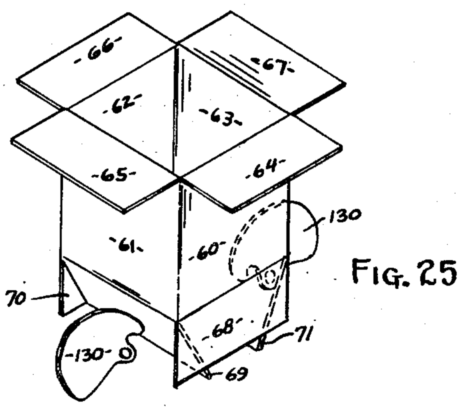

As indicated in the drawings, the top flap 64 is the leading flap on the front side of the collapsed carton. This flap is engaged by a finger 102 depending from one end of a rod 103 mounted in the upper end of a shaft 104 journalled vertically in a bracket 105 secured to a plate 106 extending inwardly from the upright 35. The inner end of the rod and the finger are urged inwardly by a tension spring 107 secured to the outer end of the rod and the upright 35, see Figure 6. The lower end of the shaft 104 is provided with an arm 108 connected to a link 109, the opposite end being connected to a link 110. The link 110 is pivotally connected at one end to an arm 111, and is pivotally connected to a similar arm 112, as at 113, the pivot point 113 being in proximity to the pivotal connection between the links 109 and 110, see Figures 3 and 14. The arm 111 is secured at one end to a shaft 114 journalled vertically in the frame on a transversely extending member 115 and a plate 116 extending inwardly from a plate 117 extending between the uprights 35, 37. The arm 112 is pivotally mounted, as at 118, to a plate 119 extending inwardly from the plate 117. These arms 111, 112, are movable from the position shown in Figure 14 to the position shown in Figure 3 to fold the top flaps 65—67 outwardly, as shown in Figure 24.

The shaft 114 has an arm 120 having a roller 121 engaged by a cam plate 122. The cam plate 122 is secured adjacent the forward end of the slide 78. The arrangement is such that when the slide 78 approaches the forward end of its stroke, the cam plate 122 engages the roller 121 and effects oscillation of the shaft 114 in a clockwise direction, Figure 3, moving the arm 111 inwardly over the filling station and through the connecting link 110, effecting a counter-clockwise movement of the arm 112. During the advancement of the carton in edgewise or vertical position, the leading edge of the carton is in engagement with a spring pressed stop member 123 extending inwardly from the slide 78.

This movement of the arms 111, 112, is effected during a short forward movement of the slide 78, and the roller on the arm 77 enters the laterally extending portion 82 of the groove in the cam bar 80. This causes the arm 77 to rotate in a clockwise direction about its pivot 79 to a position perpendicular to the slide 78, as shown in Figure 3. This movement of the arm expands the collapsed carton to tubular form. This swinging movement of the arm 77 takes place simultaneously with the swinging movement of the arms 111, 112, and the expansion being aided by outward movement of the arms 111, 112. These latter arms are positioned above the top of the carton body and engage flaps 65, 67, on opposite ends of the carton, folding these flaps outwardly into horizontal position, as illustrated in Figure 24, as previously stated.

Figure 14:
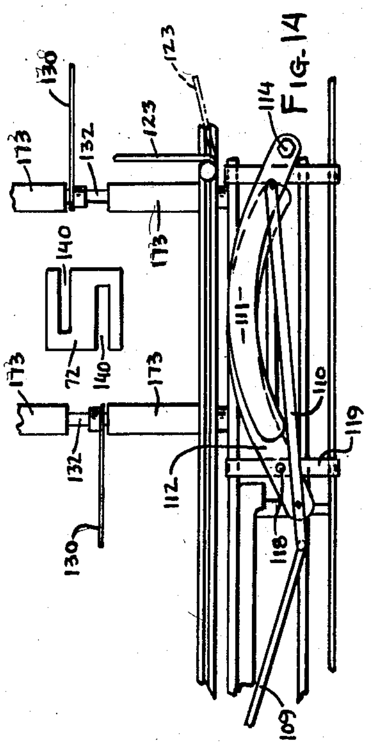
Figure 14 is a top plan view of the apparatus for opening the top flaps of the carton, with the top flap opening arms in folded position.
Figure 15:
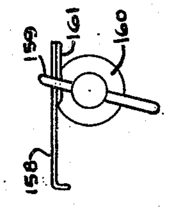
Figure 15 is an elevational view of the valve initiating the cycle of operation of the machine illustrating the valve actuating member in normal position.

The stop 123 yieldingly engages and is held against the leading edge of the collapsed carton by a torsion spring 124. The stop is moved perpendicular to the slide during the expansion of the carton, as shown in Figures 3 and 14. Upon rearward movement of the slide, the stop member is moved in a clockwise direction parallel to the slide by the filled carton, as shown in dotted lines, Figure 14. This stop aids in keeping the rear edge of the collapsed carton in the hook portion 100 of plate 99.

As soon as the carton is arranged in expanded tubular form with the flaps 64, 65, 67, folded horizontally, flaps 69, 71, are folded upwardly by cam members 130 carried by hubs 131 fixedly secured to the central portion of the shafts 132 journalled transversely in the frame of the machine below the filling station. These members are positioned, as shown in Figure 13, as the carton is advanced toward the filling station. The shafts 132 are rotated approximately 90°, causing the cam members 130 to move to the position shown in Figure 1. During this movement, the cams 130 engage the flaps 69, 71, centrally and fold them upwardly, see Figure 25.

One of the shafts 132 has secured to it hub members 133, each of which carries an arcuate shaped rod 135, these rods also inclining inwardly from the hubs 133 to the outer end portion of the rods. These rods 135 serve as cam actuating members to move side flap engaging members 136. The members 136 for lightness are also formed of rod material, each member being of general U-formation and having the ends of the leg portion of the U-formation pivoted on brackets 137 secured to the under side of the guide rails 84 on the front side of the machine and a supporting bracket 138 on the rear side of the machine. The central portion of the folding members 136 is offset as at 139 to clear the sides of the pedestal 72. The pedestal is also provided with slots 140 extending inwardly from each end edge to accommodate the folding cams 130, see Figures 3 and 14.

Figure 6:
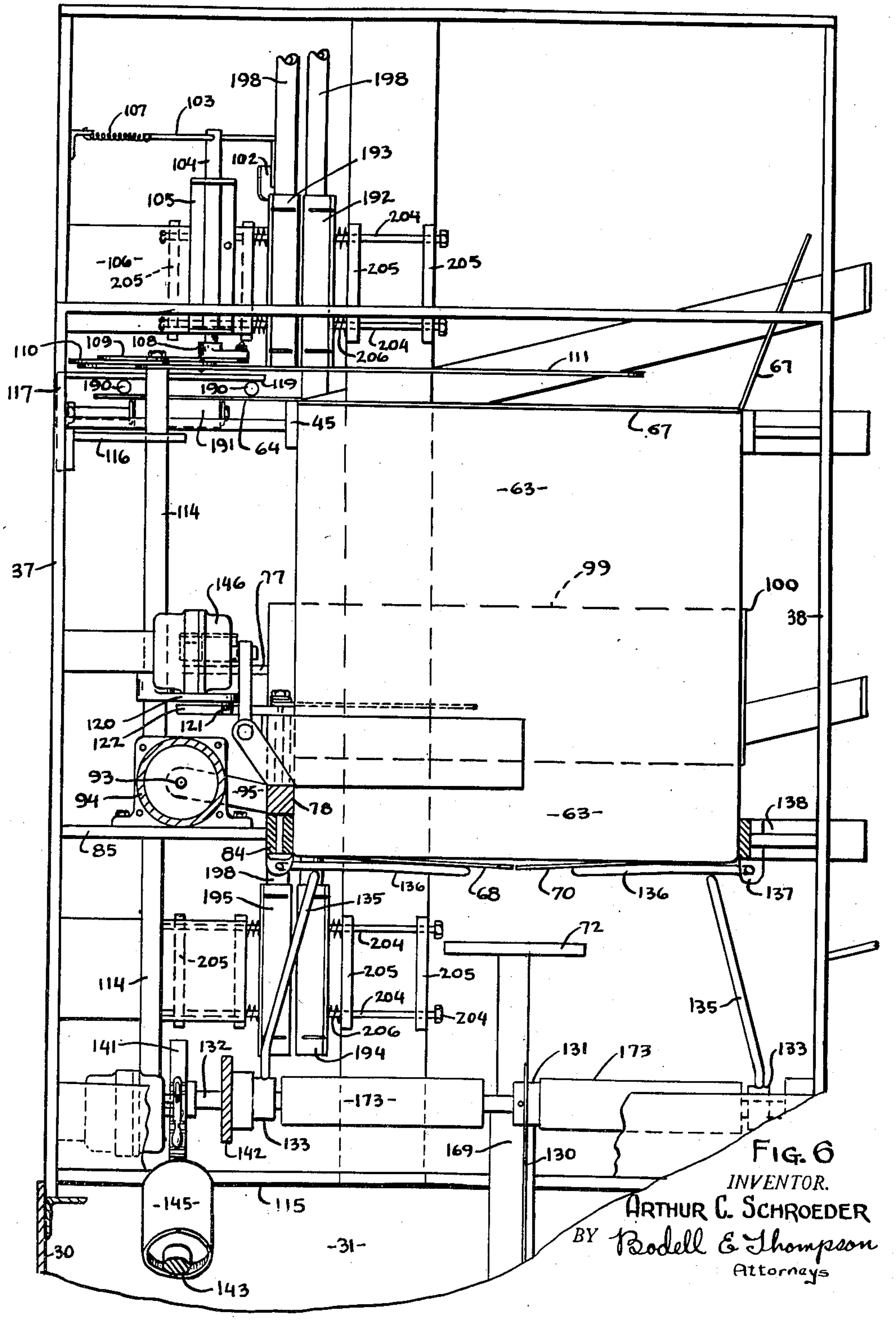
Figure 6 is a view taken on line 6—6, Figure 1.

When the collapsed carton approaches the filling station, the folding members 136 hang downwardly. The actuating members 135 are so positioned on the shaft 132 relative to the folding cams 130 that the members 135 engage the folding members 136 after the members 130 have folded the flaps 69, 71, upwardly in nearly horizontal position. Thereupon, the members 135 swing the members 136 upwardly, see Figure 6, to fold the side flaps 68, 70, upwardly, and this mechanism supports the expanded carton while the operator fills the same. The arrangement is such that the flaps 68—70 are pressed against the flaps 69—71, but are spaced therefrom, as shown in Figure 6. This permits the air within the carton to escape when the operator inserts the first layer of packages in the carton. This also permits the adhesive to penetrate the flaps during the dwell of the carton at the filling station, and before the flaps are pressure sealed. This effects a much stronger bonding of the flaps.

The shafts 132 are rotated or oscillated by a rack 141 engaging pinions 142 secured to the shafts 132. The rack 141 is secured to a piston rod 143 having a piston slidably mounted in the cylinder 145 secured to the frame of the machine. When the piston moves downwardly, Figure 1, the shafts 132 are rotated to effect folding of the bottom flaps of the carton. Fluid is supplied to the cylinder 145 through a multiport valve 146 having an inlet port connected to a conduit 147, an exhaust port 148 and discharge ports connected to conduits 149, 150. The valve is operated by actuating members 151, 152, secured to the slide 78. When the slide 78 reaches the end of its forward stroke, positioning the carton at the filling station, as previously described, the element 151 engages a projection 153 extending from the movable element of the valve 146, effecting movement thereof in a counter-clockwise direction, Figure 1. In this position, the conduit 150 is connected to the conduit 147 which, in turn, is connected to the main supply header 154. The conduit 150 is connected to the upper end of the cylinder 145, through conduits 155, 156. This causes the rack 141 to move downwardly and to effect folding of the bottom flaps, as previously described.

Figure 16:
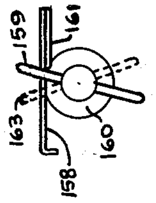
Figure 16 is a view similar to Figure 15 illustrating the valve actuating member shifted by manual operation.
Figures 5, 17:
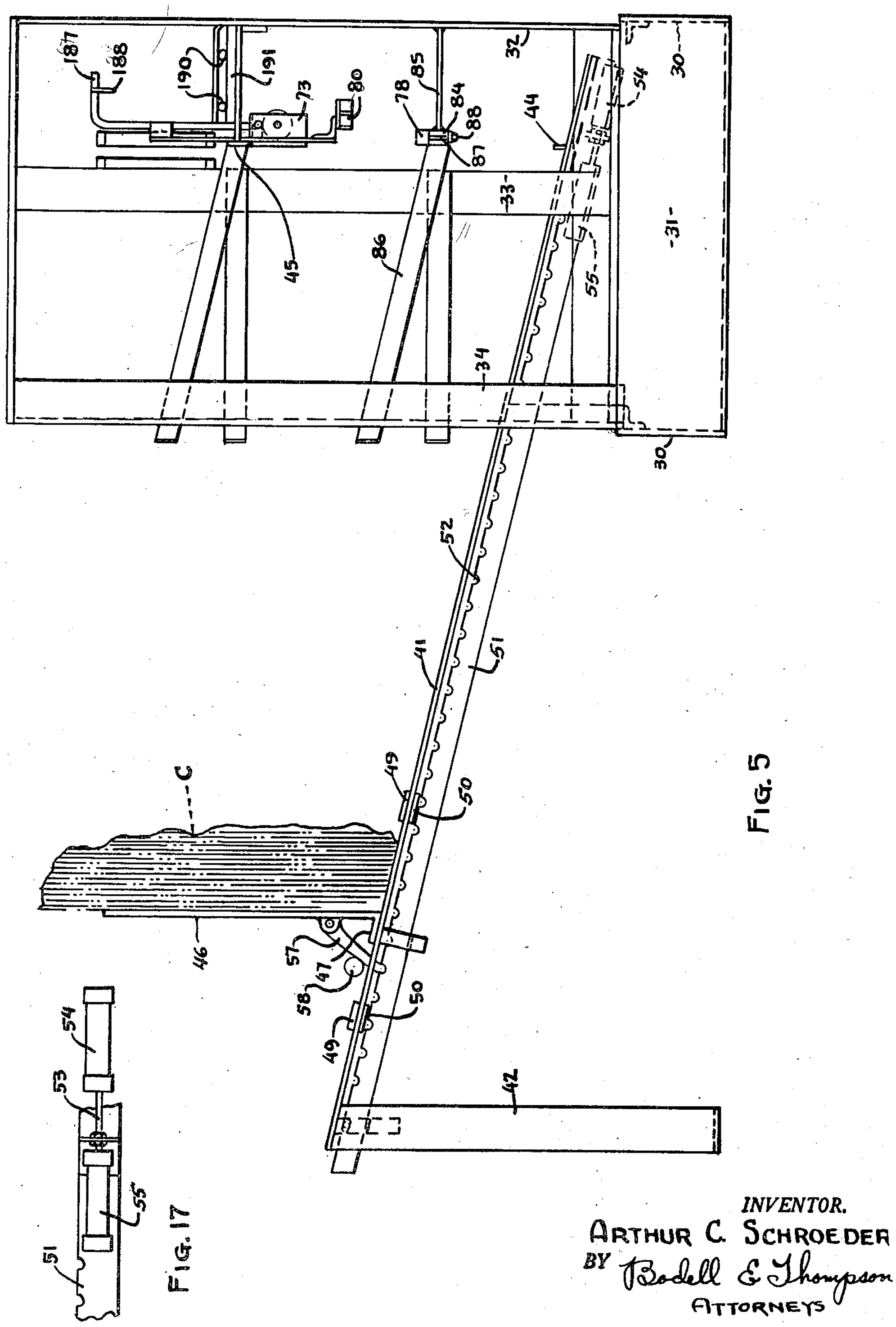
Figure 5 is an end elevational view of the apparatus looking to the right, Figures 1 and 3.
Figure 17 is a side elevational view of the fluid operated mechanism for actuating the carton supply feed.

After the operator has placed the contents into the carton, she moves one of the arms 111, 112, further outwardly, effecting further clockwise rotation of the shaft 114. This shaft has secured to it, adjacent the lower end thereof, an arm 157 to which is pivotally connected a rod 158 slidably extending through an actuating member 159 of a valve 160, see Figures 15 and 16. The under side of the portion of the rod 158, extending through the member 159, has affixed thereto a key 161. Further clockwise rotation of the shaft 114, causes the rod 158 to slide through the member 159 until the inner end of the key 161 engages the member 159, as illustrated in Figure 16. The operator then releases the top folding lever, and these levers are swung inwardly under the tension of spring 162 to their normal outfolded position effecting counter-clockwise rotation of the shaft 114, and effecting movement of the valve actuating member 159 to the dotted position 163, Figure 16. The valve 160 is connected to the fluid supply 154 by conduit 164, and is provided with an exhaust port 165 and outlet ports connected to conduits 166, 167. With the actuating member 159 moved into the position 163, the supply 164 is connected to the conduit 167 and to a branch conduit 168 leading to the bottom of a cylinder 169, on the piston rod of which the pedestal 72 is mounted. This causes the pedestal to be elevated into engagement with the bottom of the carton which heretofore has been supported by the members 135, 136. The conduit 167 extends to the forward end of the cylinder 94 and fluid pressure thus applied causes the slide 78 to move rearwardly. During the initial part of this rearward movement of the slide, the lever 77 and the plate 99 carried thereby are swung about the pivot 79 to a position parallel with the slide. This is effected by the roller on the outer end of the lever 77 cooperating with the outwardly curved portion 82 of the cam track 80. During the remainder of the rearward movement of the slide, the lever 77 maintains this parallel position and the rear movement is sufficient to place the hook portion 100 over the rear edge of the carton which has been selected and initially advanced by the plate 73.

When the slide 78 completes its rearward stroke, the projection 152 engages the member 153 of the valve 146, effecting rotation of the movable element of the valve in a clockwise direction, Figure 14, which results in connecting the supply conduit 147 with conduit 149 which establishes pressure in the lower end of the cylinder 145 and in the lower end of a cylinder 170, and connecting conduit 150 to the exhaust port 148 which exhausts fluid from the upper ends of the cylinders 145, 170, through conduits 155, 156. This condition effects upward movement of the rack 141, returning the bottom flap folders 130, 135, to normal position. The rack 141 carries an actuating member 171 engaging member 172 depending from the valve 160, shifting the movable element of this valve to connect the conduit 167 to the exhaust port 165, exhausting fluid through the rear end of cylinders 94 and 169, and permitting the pedestal 72 with the filled carton thereon to descend and be positioned upon rollers 173 journalled on the shafts 132, these rollers being arranged in alinement with bars or rails 174 mounted between the uprights 37, 38, 39, 40, and extending to the right end of the machine.

This operation of valve 160 also connects the supply conduit 164 to the conduit 166, admitting fluid pressure to the rear end of the cylinder 94, effecting forward movement of the slide 78 and of the collapsed carton engaged by the plate 99, this further movement being effected to advance the carton to the filling station, whereupon it is expanded to tubular form by clockwise movement of the arm 77, and the bottom flaps folded upwardly, and the flaps 65, 67, folded outwardly, as previously described.

Figure 20:
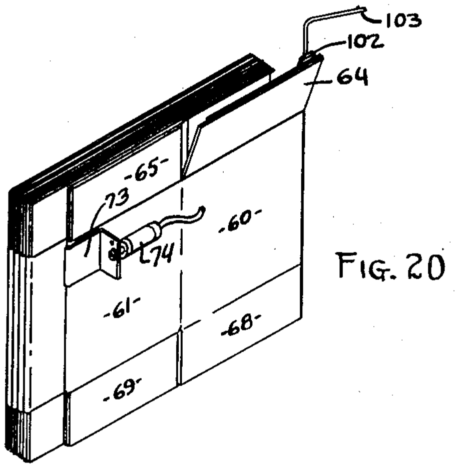
Figure 21:
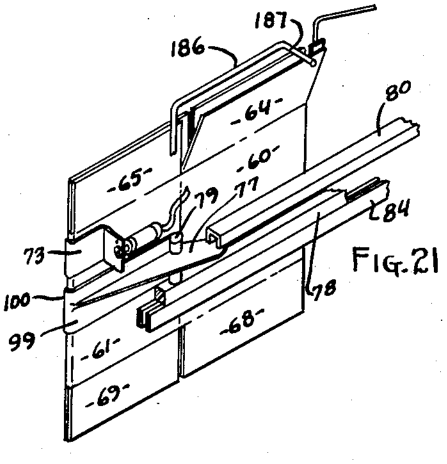
Figure 22:
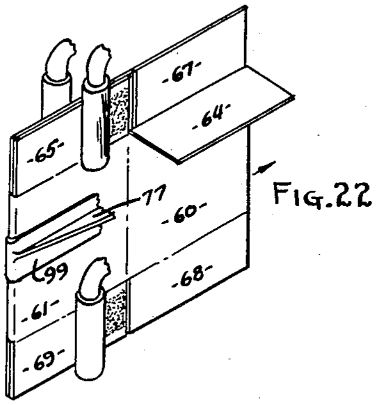
Figure 23:
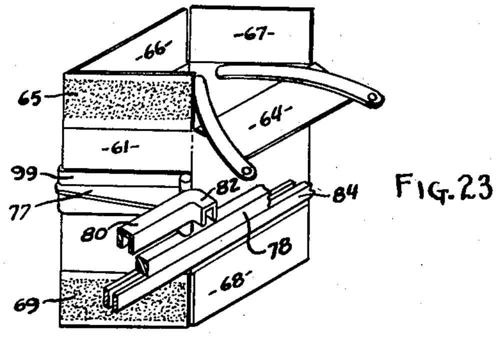

During the advancement of the flat cartons, one of the top flaps, as the flap 64, is moved outwardly into horizontal position, as shown in Figure 22, and serves to properly guide the carton in its forward advancement. Also during the advancement of the flat cartons, certain selected ones of the top and bottom flaps are coated with adhesive. When the outfolding arms 111, 112, are folded inwardly, as shown in Figure 14, the shaft 104 is rotated, causing the flag 102 to engage the upper flap 67, moving the same and the adjacent flap 64 outwardly about their score lines, as shown in Figure 20. This infolding of the arms 111, 112, occurs concurrently with the rear movement of the slide 78, as described above and, when the slide reaches the end of its rearward travel, actuation of the valve 146 by the member 152 connects the supply conduit 147 to the conduit 180, supplying fluid under pressure to the right hand end of the cylinder 74, Figure 1. This effects return movement of the selector plate 73. This plate has secured to it a forwardly extending rod 181 slidably mounted in the brackets 75, 76, and having secured to its free end an apertured plate 182 receiving the lower end of a rod 183 pivoted as at 184 to a member 185 extending upwardly from the plate 45. The upper portion of the rod 183 is bent at right angles to provide a forwardly extending portion 186, the end of which is bent outwardly, as indicated at 187.

With the flaps 64, 67, bent outwardly, as shown in Figure 20, the return movement of the plate 73 causes movement in a clockwise direction of the rod 183, Figure 1, about its pivot, moving the end portion 187 downwardly. The portion 186 of the rod is provided with a depending finger 188 arranged to engage the rear portion of the flap 64. Inasmuch as the cartons are of rectangular formation and being of less dimension on opposite sides than on the other opposite sides, the flaps 65, 67, are somewhat shorter than the flaps 64, 66. Or, in other words, the outer flap 64, when the carton is in the collapsed condition, extends rearwardly beyond the flap 67, and the finger 188 is located to engage this rear portion of the flap 64. With this arrangement, oscillation of the rod 183 effects outward folding movement of the flap 64, the finger 188 initiating this movement to separate the flap 64 from the flap 67, and the movement is completed by the portion 187 engaging the flap 64 and folding it into horizontal position, as shown in Figure 22.

As previously stated, at this time the valve 160 has been actuated to supply pressure to the rear end of the cylinder, causing the slide 78 to move forward. This forward movement of the collapsed carton positions the outfolded flap 64 between a pair of guide rods 190, and a series of rollers 191 journalled below the guide rods, see Figure 6. The rollers 191 are arranged intermediate the guide rods and the arrangement is such that the center portion of the flap 64 is bowed slightly upwardly, whereby the flap 64 is kept under control and guided during its forward movement and accordingly, the carton is likewise guided. It is to be remembered that during this forward movement of the collapsed carton, all of the other flaps, both top and bottom, are extending in vertical relation. These flaps are passed between adhesive applicators 192, 193, 194, 195, Figure 18, the applicators 192, 193, being arranged in spaced relation to receive the top flaps 65, 66, 67, and the bottom pair of applicators 194, 195, being arranged to receive the bottom flaps 68, 69, 70 and 71. These applicators operate to coat the flaps 65, 67, and the flaps 69, 71, with adhesive during the forward advancement of the collapsed carton.

Figures 7, 8, 9:
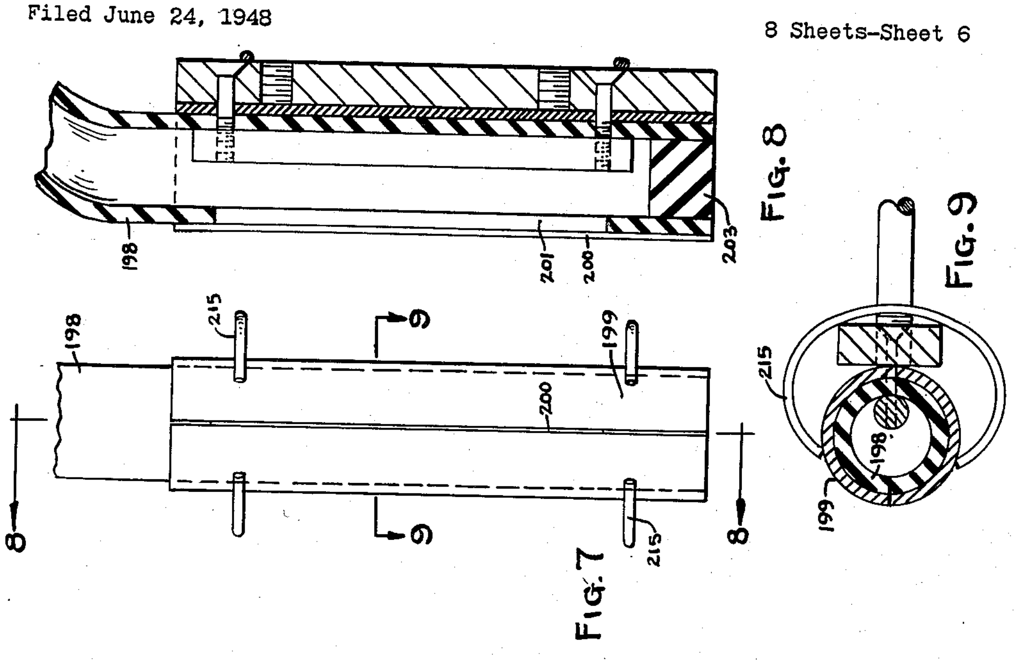
Figure 7 is an elevational view of one of the glue applying devices.
Figure 8 is a view taken on line 8—8, Figure 7.
Figure 9 is a view taken on line 9—9, Figure 7.
Figure 10:
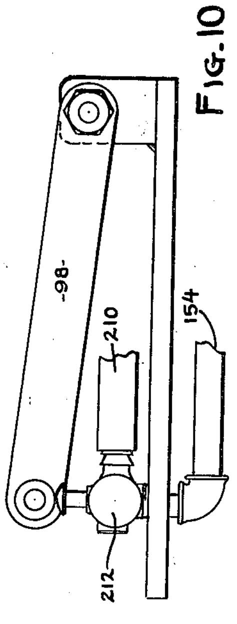
Figure 10 is a side elevational view of one of the air valves controlling the gluing devices and the pivoted actuating element for the valve, the valve being shown in the off position.
Figure 11:
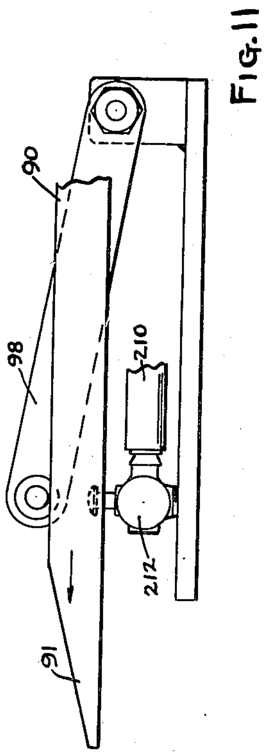
Figure 11 is a view similar to Figure 10, the valve being shown in the off position, the sliding actuating element being illustrated on its return stroke and in engagement with the pivoted actuating element.
Figure 12:
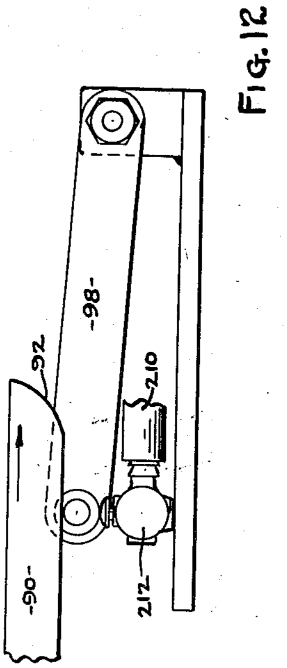
Figure 12 is a view similar to Figures 10 and 11 with the sliding actuating element showing its advance stroke engaging the pivoted actuating element actuating the valve to its on position.

The adhesive applicators are all of identical construction, the detail structure of these applicators being disclosed in Figures 7, 8, and 9. Each applicator consists of a tube 198 formed of relatively soft resilient material, such as rubber, positioned in a tube of relatively rigid resilient material, such as spring brass, or the like. The outer tube 199 is formed with a slit 200 extending the entire length of the tube 199. The inner tube 198 is formed with a slit 201 arranged in register with the slit 200, but terminating short of the ends thereof, see Figure 8. The end of the inner tube is closed as by a plug member 203. This assembly is mounted upon rods 204 slidably mounted in brackets 205 secured to the frame of the apparatus. The applicators are arranged in pairs with the slits 200, 201, of the applicators in confronting relation, and the applicators are yieldingly urged toward each other by compression springs 206 mounted between the applicators and the adjacent bracket 205, see Figure 6.

The tubes 198 are connected to conduits 207 which, in turn, are connected to an adhesive supply reservoir 208 through check valves 209. The conduits 207 are formed with branch conduits 210, 211, connected to the main fluid supply 154, through valves 212, 213, these branch circuits 210, 211, being connected intermediate the check valves 209 and the tubes 198.

Normally, the slits 201 are closed due to the resiliency of the tube 198 and the outer reinforcing tube 199, the function of which is to lend rigidity to the applicator and maintain it in cylindrical form. Also, the resiliency of the outer metal tube functions to more quickly and completely close the slit in the inner tube upon the cessation of pressure on the adhesive within the tube. Spring members 215 may be added to increase the radial expansive resistance of the outer tube. The arrangement is such that when pressure is applied to the tubes 198, through the valves 212, 213, the inner and outer tubes expand radially to open the slits 200, 201, to permit the adhesive to flow, or exude, through the slits and onto the end flaps contacted by the applicators. With this arrangement, the amount of adhesive applied can be accurately controlled by the pressure applied through the valves 212, 213. The supply pipe 154 is provided with a regulating valve 216 by which the pressure supplied to the valves 212, 213, can be regularly and conveniently regulated within close limits.

Figures 18, 19:
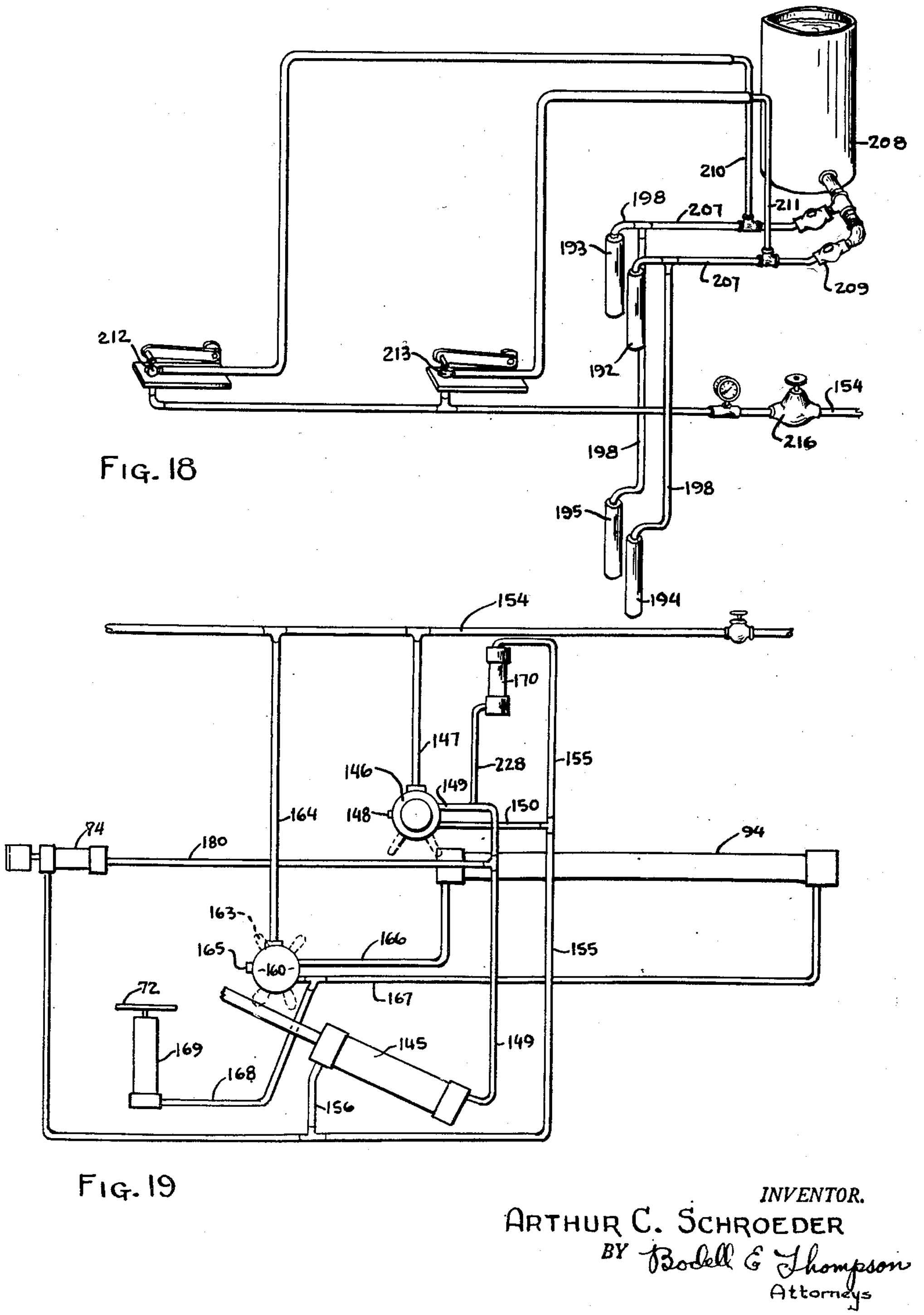
Figure 18 is a schematic diagram of the conduit system associated with the glue applying mechanism.
Figure 19 is a schematic diagram of the fluid actuating elements and system for operating the machine.

It will be observed, referring to Figure 18, that insofar as the connection to the adhesive supply 208 is concerned, the applicators 192, 194, are connected in pairs and similarly, the applicators 193, 195, are connected in pairs. It will be also observed that the applicators 193, 195, are controlled by the valve 212, while the applicators 192, 194, are controlled by the valve 213. The reason for this arrangement is to effect the application of the adhesive to only selected ones of the end flaps. As the flat cartons are advanced, the flaps 64, 67, are positioned forwardly of the flaps 65, 66, and as to the bottom flaps, the flaps 68, 71, are positioned forwardly of the flaps 69, 70. In sealing cartons, it is conventional practice to apply adhesive to the outer surface of flaps on the opposite sides of the cartons, these flaps being the ones that are folded in first, so that the adhesive is accordingly present to secure down the flaps on the opposite side which are folded in subsequently.

Attention was previously called to the fact that the slide 78 has secured to the rear portion thereof an actuating member 90 which functions on the forward movement of the slide to operate the valves 212, 213 and, inasmuch as these valves are spaced apart, they are operated successively. The valve 212 is first actuated to open position, supplying pressure on the adhesive that has flowed into the tubes 198 associated with the applicators 193, 195. When the valve 212 is thus opened, the leading edge of the flaps 67, 71, are in juxtaposition to the slits 200, 201, in these applicators. Accordingly, the adhesive being forced out through the slits in these applicators is applied to the outer surface of those flaps. As the slide and the carton advance forwardly, the actuator 90 moves out of engagement with the valve 212 and into engagement with the valve 213. When the valve 212 is closed, cutting off the pressure on the applicators 193, 195, the outer metallic tube 200 contracts, closing the slit 200 and effecting a contraction of the inner tube 198, closing the slit 201 therein, thus quickly and completely cutting off the exudation of adhesive, so that no adhesive is applied to the top and bottom flaps 66, 70, on the rear side of the carton. However, the valve 213 is now opened, causing the applications 192, 194, to function, effecting the application of adhesive on the flaps 65, 69. The lower flap 65, not having any adhesive applied thereto because at the time it was in juxtaposition to the applicator 194, the valve 213 was closed.

Figure 2:
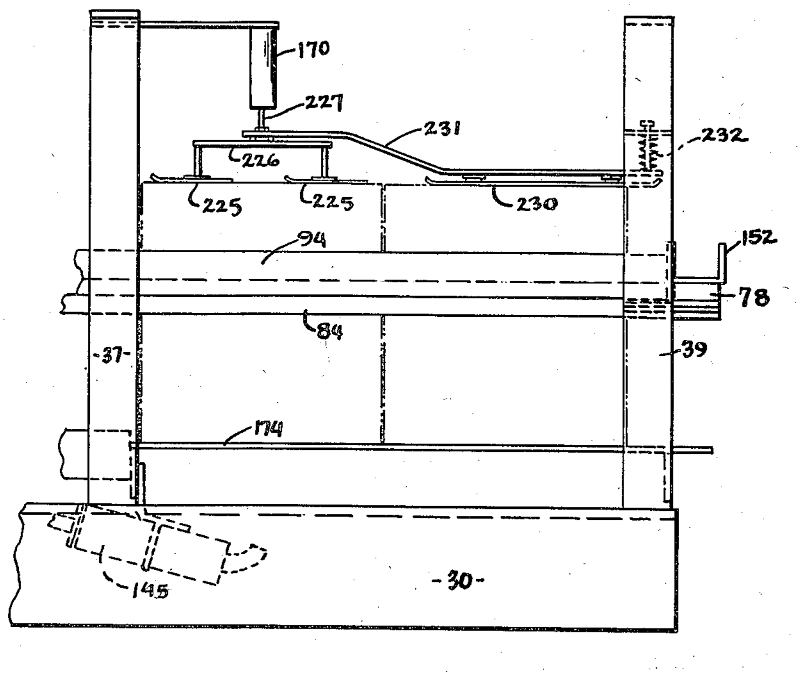
Figure 2 is a side elevational view of the remaining portion of the apparatus, Figure 2 constituting an extension to the right of Figure 1.

It will be apparent that the adhesive applying mechanism described is operable to apply adhesive to certain selected ones of the bottom and top flaps of the carton. When the carton has been advanced to the filling station and has been expanded into tubular form, and the bottom flaps folded upwardly by the members 130, 135, these bottom flaps are not folded into tight engagement but only in proximity to each other, as shown in Figure 6. Accordingly, the bottom structure of the carton is not tight, and this permits the escape of air as the operator completes the packing of the first layer of packages in the carton. When the carton has been filled and lowered by the pedestal 72, it is advanced forwardly on rails 174. The cartons are advanced by a member 221 pivotally mounted at 222 to the slide 78. The member 221 extends inwardly from the slide and is yieldingly held against a stop 223 by a tension spring 224, see Figure 3. As the slide moves rearwardly, the member 221 engages the filled carton and swings about its pivot to a position parallel with the slide until it has cleared the carton on the pedestal 72, whereupon it reassumes a transversely extending portion under the influence of the spring 224. Upon forward movement of the slide, the member engages the rear side of the carton and propels it along the rails 174. The weight of the filled carton on the rails 174 compresses the bottom flaps into tight engagement and causes the flaps to be effectively sealed by the adhesive previously applied and which has had an opportunity to penetrate into the flaps while the carton was supported by the following members 135, 136, at the filling station. The filled carton is advanced to the position indicated by dotted outline in the left portion of Figure 2, at which time it is positioned below presser plates 225 carried by a member 226 connected to piston rod 227 associated with a piston arranged in the cylinder 170. During the forward movement of the carton, air is supplied to the lower end of the cylinder 170, through branch conduit 228, see Figure 19, moving the presser plates 225 upwardly to allow the carton to be advanced underneath these members. The carton remains in this position while the next succeeding carton is being filled at the filling station and, during this period, air is admitted to the top of the cylinder 170, through pipe 155 and exhausted through the lower end of the cylinder through the valve 146, whereupon the presser plates are moved downwardly on the top flaps and exert a proper sealing pressure thereon. During the next forward movement of the slide 78, the carton is engaged by the next preceding carton being moved from the filling station, and is advanced to the position shown in dotted outline at the right of Figure 2. At this station, the top flaps are moved into engagement with an elongated presser pad 230 connected to the plate 226 by a bracket 231, the rear end of which is yieldingly urged downwardly by a compression spring 232. The plate 230 functions to continue the exertion of sealing pressure on the carton for another cycle of operation of the apparatus. During the next forward movement of the slide, the carton is moved out of the machine.

From the above description of the apparatus, it will be apparent that the machine functions to auotmatically advance collapsed cartons, applying adhesive to selected ones of the end flaps during the advancement, automatically initially fold the bottom flaps and expand the top flaps for filling, and after filling, the carton is advanced through adhesive setting stations. The apparatus accordingly eliminates manual operations on the part of the operator in picking up the collapsed cartons, expanding them to tubular form, applying adhesive, and holding the carton in position while placing the contents therein.

The adhesive is applied to the selected flaps in the precise amount needed to make the most effective sealing bond. The structure of the apparatus functions to apply adhesive uniformly to the surface of the flaps. The outer tube or sleeve 199 functions to maintain the slits 200, 201, of uniform width throughout their length and accordingly, a uniform film of adhesive is exuded upon the flaps. The adhesive is applied evenly and uniformly regardless of the condition of the surface of the flaps, the amount of adhesive applied of any viscosity being accurately determined by the amount of air pressure applied to the adhesive supply conduits through the regulating valve 216. It will be apparent that the application of adhesive is uniform regardless of any irregularities in the surface of the flaps which is not the case when the adhesive is applied by means of rollers or the like. Due to the fact that the adhesive is properly coated on the flaps, and due to the arrangement by which this coating is allowed to penetrate the flaps previous to the application of pressure on the flaps, less time and less pressure is required to effect, the sealing operation. This results in the over all length of the machine being materially reduced inasmuch as this sealing is completed during the filling of two cartons.

The presser plates for exerting the pressure sealing are advantageous in that the pressure is applied continuously while the carton remains at rest. This is a distinct advantage over the previous roller-belt type of compression units wherein the pressure is applied on the flaps intermittently, causing the carton to act as an air pump and continuously breaking the seals between the flaps, not permitting the proper setting or crystallizing of the adhesive.

What I claim is:

1. A carton handling apparatus comprising a frame, means for supporting a supply of flat collapsed cartons with the top and bottom end flaps extending vertically, means operable to advance said cartons successively from said supply to a carton filling station, adhesive applying means operable to apply adhesive to selected ones of said top and bottom flaps during such advancement of the collapsed cartons, expanding means cooperable with said advancing means to expand the cartons at said filling station to tubular form, folding means operable at said filling station to fold the bottom flaps upwardly to nearly closed position, and means positioned at said filling station and operable to fold top flaps on opposite sides of the expanded carton outwardly to a horizontal open position.

2. A carton handling apparatus comprising a frame, means for supporting a supply of flat collapsed cartons with the top and bottom end flaps extending vertically, means operable to advance said cartons successively from said supply to a carton filling station, adhesive applying means operable to apply adhesive to selected ones of said top and bottom flaps during such advancement of the collapsed cartons, expanding means cooperable with said advancing means to expand the cartons at said filling station to tubular form, means arranged at said filling station and operable to fold top flaps on opposite sides of the expanded carton outwardly to horizontal open position, and folding means operable to fold the bottom flaps upwardly to nearly closed position and supporting the carton with the bottom flaps out of sealing engagement during the filling operation.

3. A carton handling apparatus comprising a frame, means for supporting a supply of cartons in flat collapsed condition with the top and bottom end flaps extending vertically, carton selecting means operable to successively select cartons from said supply and advance the same to a flap folding station, flap folding means operable at said station to fold one top end flap from vertical to horizontal position, carton advancing means operable to advance the collapsed cartons from said flap folding station to a filling station, adhesive applying means operable to apply adhesive to selected ones of said vertical top and bottom flaps during the advance of the collapsed cartons, said carton advancing means being operable as the carton is positioned at said filling station to expand the collapsed carton to tubular form, bottom flap folding means operable at said filling station to fold the bottom flaps upwardly to nearly closed position, and means positioned at said filling station and operable to fold top flaps on opposite sides of the expanded carton outwardly to horizontal position.

4. A carton handling apparatus comprising means for supporting a carton in flat collapsed condition, an adhesive applicator arranged in juxtaposition to said carton, said applicator comprising a tubular member extending parallel to the surface of the carton formed of resilient material and having an elongated slit in the side wall confronting the carton, means yieldingly restraining said member from radial expansion, one end of said member being closed, and the opposite end being connected to a supply of adhesive, means operable to apply pressure to the adhesive and effect radial expansion of said tubular member to open said slit for exudation of the adhesive, and means operable to effect relative movement between the carton and said member during such expansion.

5. A carton handling apparatus comprising a frame, means for supporting a supply of flat collapsed cartons on edge with the top and bottom end flaps extending vertically, flap folding means operable to fold one top end flap from vertical to horizontal position, carton advancing means operable to advance said cartons in said flat folded condition, carton guide means operable to support said cartons during such advancement by said horizontally folded flap, said advancing means having a member movable transversely of the path of the advancing cartons and being operable to expand the flat folded carton to tubular form.

6. A carton handling apparatus comprising a carton supporting means operable to support a flat collapsed carton in vertical edgewise position by one of its top end flaps only, a carton expanding member engaging only the exterior surface of the carton and operable to expand the flat collapsed carton to tubular form while held by said supporting means, and flap folding means operable to fold the bottom flaps inwardly to closed position.

7. A carton handling apparatus comprising means for supporting a flat collapsed carton in vertical edgewise position by one of its top end flaps only, carton expanding means engaging only the exterior surface of the carton and operable to expand the flat collapsed carton to tubular form while held by said supporting means, and flap folding means cooperable to fold certain of said other top flaps outwardly.

8. An apparatus for handling cartons comprising means for supporting a flat collapsed carton in vertical edgewise position by one of its top flaps only, expanding means operable to expand the flat collapsed carton to expanded tubular form, bottom flap folding members operable to fold the bottom flaps inwardly to closed position, and top flap folding means operable to fold certain of said other top flaps outwardly to horizontal position.

9. An applicator for applying adhesive to a plane surface comprising a tubular member closed at one end and having its opposite end connected to a supply of adhesive, said tube being formed with a normally closed elongated slit extending through the side wall of the tube, said tube being radially expansible upon pressure applied to the adhesive within the tube to open said slit to permit exudation of the adhesive, and means operable to apply a predetermined pressure on the adhesive within the tube.

10. An applicator for applying adhesive to plane surfaces comprising a tubular member closed at one end and having its opposite end connected to a supply of adhesive, said tubular member being formed with an axially extending slit, an outer reinforcing tube encircling said tubular member and being formed with an axially extending slit arranged in register with the slit in said tubular member, said outer reinforcing tube being cooperable to maintain said inner tubular member in cylindrical form and to maintain the slot therein closed, said tubular members being radially expansible on application of pressure on the adhesive to open said slits to permit exudation of the adhesive, and means operable to apply pressure on the adhesive within the inner tubular member.

11. An applicator for applying adhesive to cartons and the like comprising an inner tubular member formed of resilient material and having a normally closed axially extending slit in the side wall of the tube, said tube being closed at one end and the opposite end being connected to a supply of adhesive, said tube being expansible to open said slit to permit exudation of said adhesive, and means cooperable to maintain said slit of uniform width when open.

12. An applicator for applying adhesive to cartons and the like comprising an inner tubular member formed of resilient material and having an axially extending slit in the side wall of the tube, said tube being closed at one end and the opposite end being connected to a supply of adhesive, an outer sleeve encircling said inner tube and having a slit arranged in register with the slit in said inner tube, and said tube and sleeve being uniformly expandible throughout the length of said slits upon the application of pressure on the adhesive in the inner tube.

13. A carton handling apparatus comprising a frame, a guideway, means for supporting a supply of flat collapsed cartons at one end of said guideway, a slide member, means operable to effect reciprocation of said member along said guideway, carton engaging members mounted on said slide member and being spaced apart for engagement with opposite edges of the collapsed carton, one of said carton engaging members being mounted on said slide for pivotal movement and being normally positioned parallel to the slide and being operable upon pivotal movement to expand a flat collapsed carton to tubular form, and means operable upon the advancement of each carton to effect pivotal movement of said carton engaging member.

14. Apparatus for handling flat collapsed cartons including a carton advancing slide, carton engaging members carried by said slide and arranged to engage opposite edges of the collapsed carton and maintain the same in vertical edgewise position during movement of the slide, and adhesive applying means operable to apply adhesive to selected areas of the collapsed carton during the advancement thereof.

15. Apparatus for handling flat collapsed cartons, each side wall of which is formed with integral top and bottom end closure flaps, a flat folding member operable to fold one end closure flap of the flat collapsed carton outwardly into horizontal position, carton advancing means operable to advance the flat collapsed carton while maintaining the same in vertical position, and adhesive applying means operable to apply adhesive to selected ones of the remaining flaps of the carton during the advancement thereof.

16. Apparatus for handling cartons, each side wall of which is provided with a top and bottom end closure flap comprising means for supporting a supply of cartons in flat collapsed condition, a guideway, a filling station located along said guideway, carton advancing means operable to successively advance flat collapsed cartons from a supply along said guideway to said filling station, a plurality of adhesive applicators arranged in juxtaposition to said guideway and being operable to apply adhesive to selected ones of said top and bottom end closure flaps during the advancement of said cartons.

17. Apparatus for handling cartons, each side wall of which is formed with a top closure flap and a bottom closure flap comprising means for supporting a supply of cartons in flat collapsed condition, a guideway, a filling station located along said guideway, carton advancing means operable to successively advance collapsed cartons from said supply to said filling station and being operable to expand the cartons into tubular form at said station, said advancing means being also operable to advance filled cartons from said filling station, a plurality of adhesive applicators arranged in juxtaposition to said guideway and being operable to apply adhesive to certain selected ones of said top and bottom end closure flaps during the advancement of said cartons.

ARTHUR C. SCHROEDER.

References Cited in the file of this patent

UNITED STATES PATENTS

| Number | Name | Date |
|---|---|---|
| 1,044,500 | Converse | Nov. 19, 1912 |
| 1,177,719 | Milmoe | Apr. 4, 1916 |
| 1,495,191 | MacNaughton | May 27, 1924 |
| 1,527,030 | Delamere et al. | Feb. 17, 1925 |
| 1,659,718 | Bergstein | Feb. 21, 1928 |
| 1,702,508 | Herrman | Feb. 19, 1929 |
| 1,895,617 | Fay | Jan. 31, 1933 |
| 1,909,627 | Opper | May 16, 1933 |
| 1,964,860 | Rabe et al. | July 3, 1934 |
| 1,991,223 | Ledig | Feb. 12, 1935 |
| 2,069,256 | MacKenzie | Feb. 2, 1937 |
| 2,097,428 | Bergstein | Nov. 2, 1937 |
| 2,134,418 | Rose | Oct. 25, 1938 |
| 2,220,390 | Bishop | Nov. 5, 1940 |
| 2,285,227 | Pernu | June 2, 1942 |
| 2,289,820 | Ardell | July 14, 1942 |
| 2,318,208 | First et al. | May 4, 1943 |
| 2,371,871 | Burckhardt | Mar. 20, 1945 |
| 2,381,961 | Knowlton | Aug. 14, 1945 |
| 2,464,407 | Levkoff | Mar. 15, 1949 |